A. D. FISHER & T. S. SCOTT.
MEANS FOR REMOVABLY SECURING DEMOUNTABLE WHEEL RIMS.
APPLICATION FILED APR. 3, 1917.
1,250,831.
Patented Dec. 18, 1917.
3 SHEETS—SHEET 1.
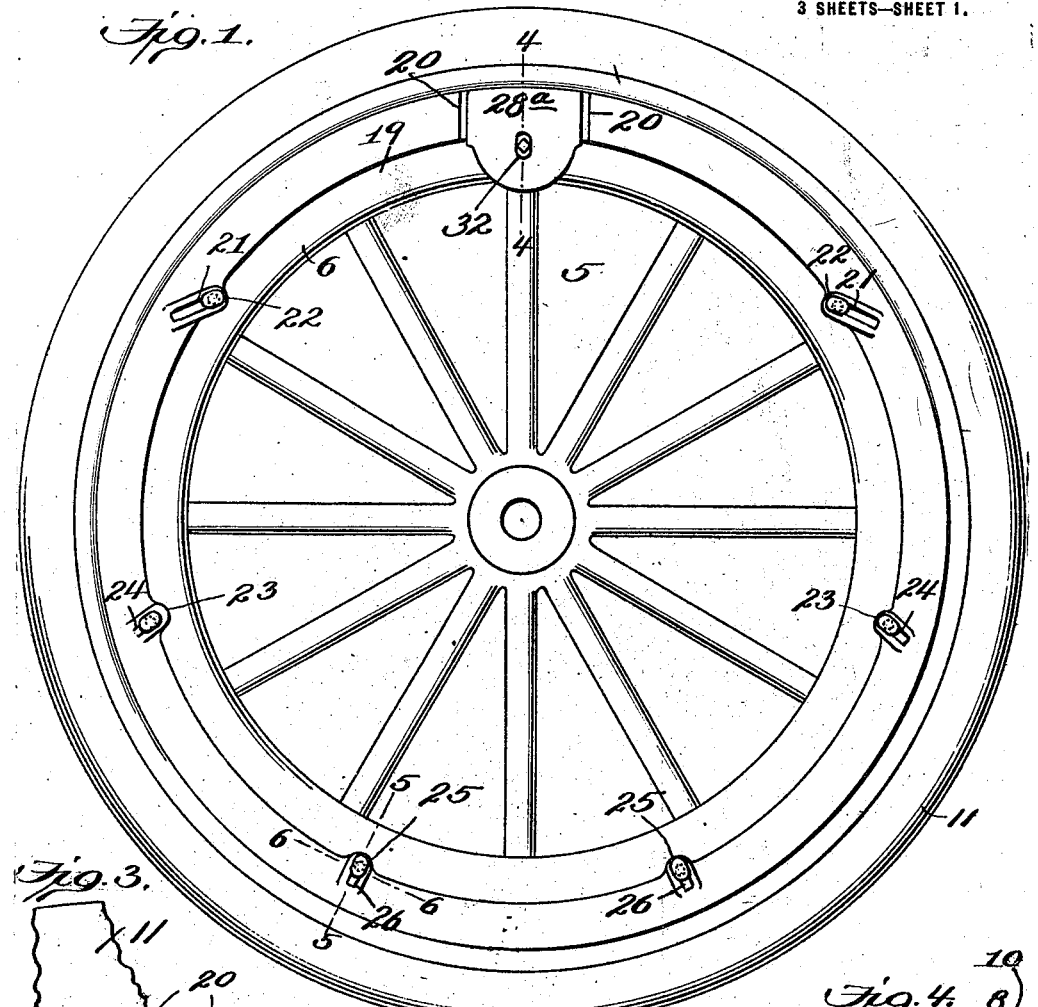
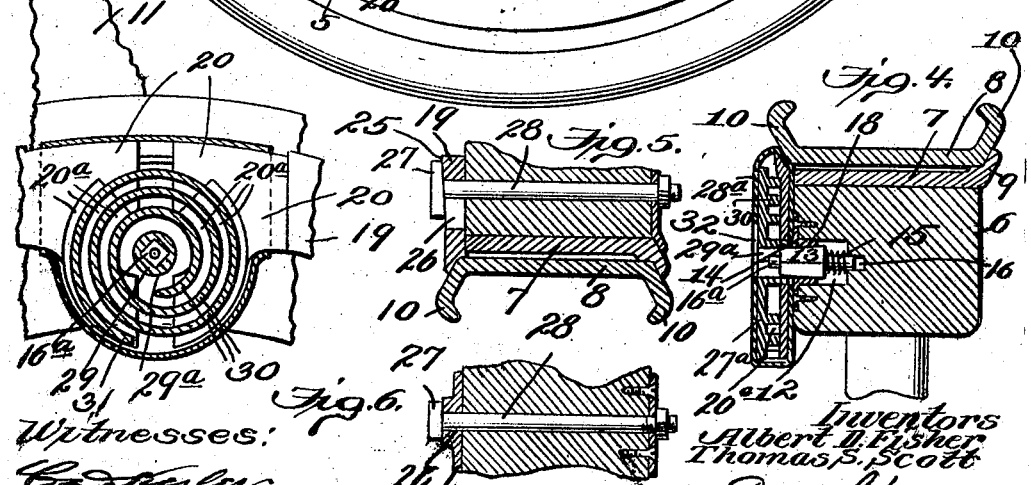

A. D. FISHER & T. S. SCOTT.
MEANS FOR REMOVABLY SECURING DEMOUNTABLE WHEEL RIMS.
APPLICATION FILED APR. 3, 1917.
1,250,831.
Patented Dec. 18, 1917.
3 SHEETS—SHEET 2.
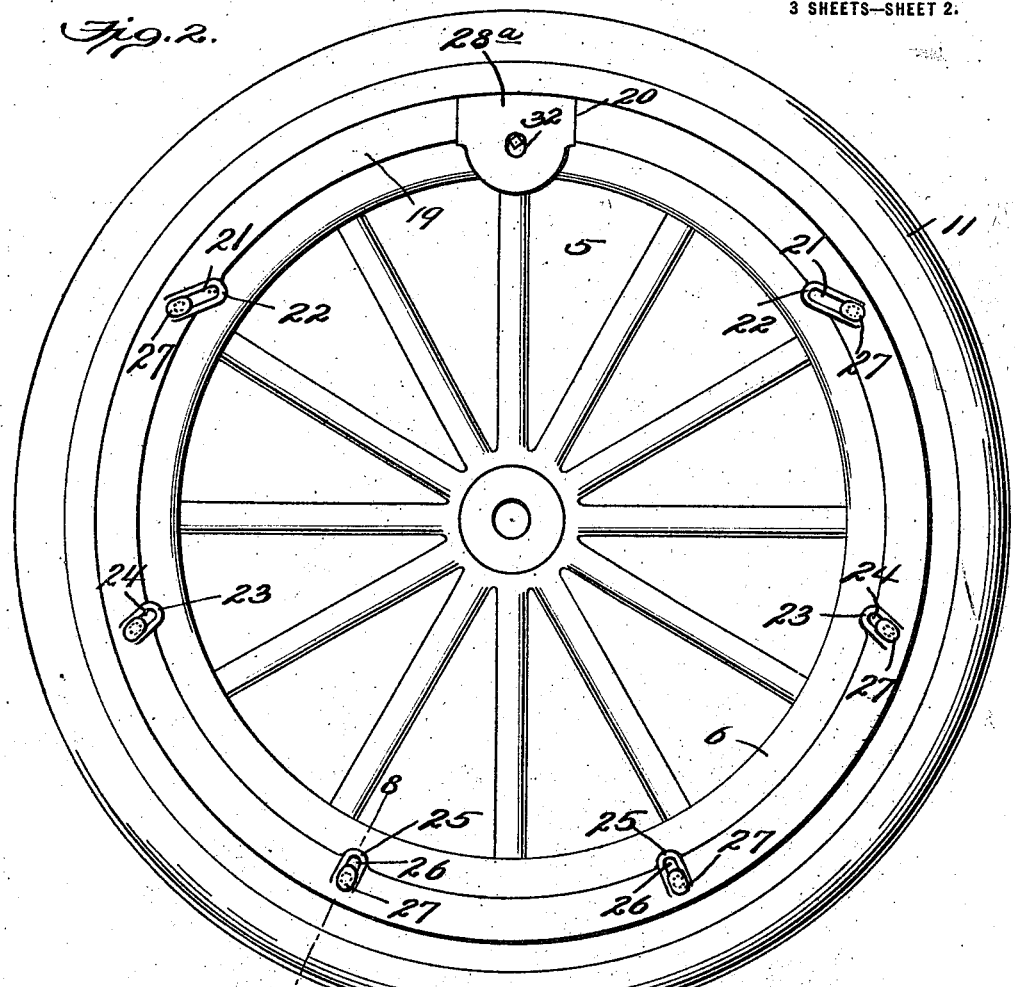
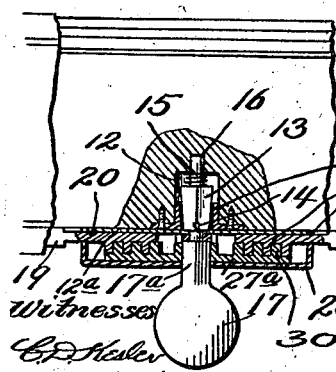
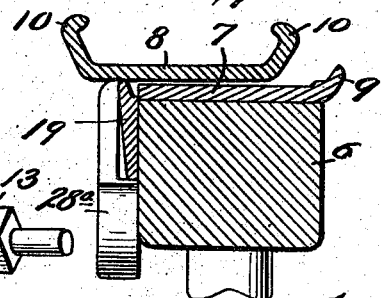

A. D. FISHER & T. S. SCOTT.
MEANS FOR REMOVABLY SECURING DEMOUNTABLE WHEEL RIMS.
APPLICATION FILED APR. 3, 1917.

1,250,831.

Patented Dec. 18, 1917.
3 SHEETS—SHEET 3.

Witnesses:

Inventors
Albert D. Fisher
Thomas S. Scott
by
Attorney

UNITED STATES PATENT OFFICE.

ALBERT D. FISHER AND THOMAS S. SCOTT, OF WINCHESTER, KENTUCKY.

MEANS FOR REMOVABLY SECURING DEMOUNTABLE WHEEL-RIMS.

1,250,831. Specification of Letters Patent. Patented Dec. 18, 1917.

Application filed April 3, 1917. Serial No. 159,468.

*To all whom it may concern:*

Be it known that we, ALBERT D. FISHER and THOMAS S. SCOTT, citizens of the United States, residing at Winchester, in the county of Clark and State of Kentucky, have invented new and useful Improvements in Means for Removably Securing Demountable Wheel-Rims, of which the following is a specification.

This invention relates to means for removing or replacing a demountable rim for automobile wheels, and the essential objects of the same are to provide a metal ring permanently associated and attached to the side of the wheel against the felly and operable to expeditiously remove the tire or clencher rim and to provide devices in connection therewith for insuring a firm holding of the tire or clencher rim in place and eliminating lost motion at any point; to provide expanding means for locking a tire or clencher rim in place, said expanding means becoming in effect a solid ring and resisting radial and lateral pressure relatively to the demountable rim and thereby avoiding the necessity of a specially designed tire or clencher rim or felly rim; and to provide a securing means for a demountable rim capable of being operatively applied or attached to any type of wheel or demountable rim by varying the size or dimensions thereof, and to embody in a device of this class a simple construction comprising comparatively few parts which may be easily operated to perform the desired functions thereof.

With these and other objects and advantages in view the invention consists in the construction and arrangement of the several parts which will be more fully hereinafter described and claimed.

In the drawings:

Figure 1 is an elevation of an automobile wheel embodying a demountable rim and illustrating the features of the invention applied thereto and showing the improved device in expanded and locked condition.

Fig. 2 is a view similar to Fig. 1 illustrating the attachment as contracted for the purpose of removing the demountable rim and tire from the wheel.

Fig. 3 is an enlarged detail sectional elevation of a portion of the wheel, demountable rim and tire and the attachment and particularly illustrating the locking means therefor.

Fig. 4 is a transverse vertical section taken in the plane of the line 4—4, Fig. 1, and showing the demountable rim without the tire.

Fig. 5 is a transverse vertical section taken in the plane of the line 5—5, Fig. 1, also showing the demountable rim without the tire.

Fig. 6 is a section taken in the plane of the line 6—6, Fig. 1.

Fig. 7 is a horizontal sectional view of part of the wheel and the attachment showing the removable key in operable relation to the locking means.

Fig. 8 is a detail cross-section taken in the plane of the line 8—8, Fig. 2, showing the holding ring of the attachment contracted for clearing and permitting the removal of the demountable rim.

Fig. 9 illustrates detail perspective views of the ratchet locking means for the attachment.

Figure 10:
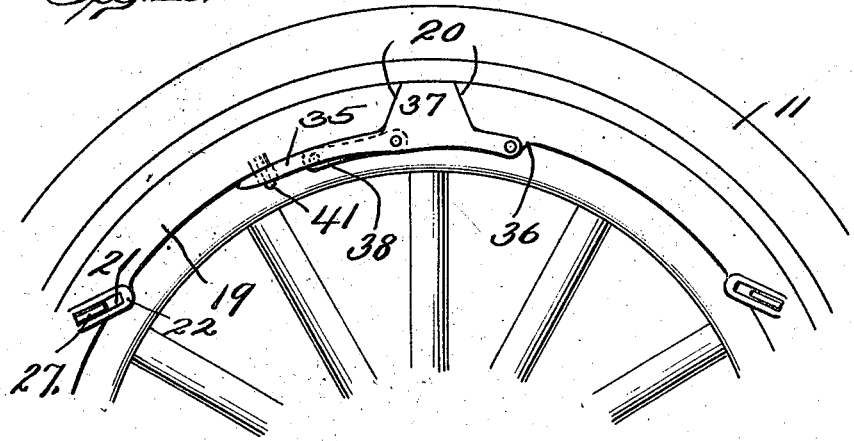
Fig. 10 is an elevation of a portion of a wheel showing a modification of the improved attachment, the parts being in position to expand the locking ring and hold the demountable rim in place.

The numeral 5 designates a wheel of any suitable dimensions and construction having a felly 6 provided with a rim 7 constructed to removably receive a demountable rim 8, the rim 7 having a fixed retaining flange 9 at one side and clear of any projection or flange at the opposite side. The demountable rim 8 has the usual flanges 10 at opposite sides for engaging a clencher or casing forming part of the usual pneumatic or analogous tire 11. At one point the felly 6 is formed with a socket 12 which is shaped to receive a slightly tapered plunger 13 having a locking lug or tooth 14 and a spring 15 surrounding a reduced terminal or stem 16 at the inner end of the plunger, the spring 15 having the normal tendency to force the plunger 13 with its lug or tooth 14 outwardly from the socket 12. The plunger 13 also has a reduced contact projection 16ª at its outer end, and said plunger constructed as specified and the spring 15 constitute an automatic catch or locking device which is adapted to be operated or released from locking position by a key 17 having an angular stem 17ª, as shown by Fig. 7. The plunger 13 is angular in cross-section and engages a socket sleeve 18 which is of corresponding shape and serves as a guide and wear take-up means, and it will be seen that the socket 12 is deep enough to compensate for a maximum inward depression of the plunger and its stem 16 for releasing the lug or tooth 14 for purposes which will be presently explained.

One of the most essential features of the invention is a metal ring 19 which is movably held on the side of the felly 6 on the same side through which the socket 12 opens outwardly, said metal ring 19 being expansible and contractible and operating in its expanded condition to lock the demountable rim 8 against displacement from the rim 7 of the felly 6 by projecting outwardly beyond the said rim 7 and firmly bearing against a portion of one side of the demountable rim 8. The ring 19 may be said to form a binder relatively to the demountable rim 8, the said ring being readily operable to clear the demountable rim at one side to permit the said rim to be removed or replaced as the case may be. The ring or binder 19 is provided with means whereby it may be practically expanded and contracted without too loose engagement relatively to the felly 6 and to avoid lost motion, and, moreover, the said ring may be expanded or contracted without becoming detached from the felly. The two ends 20 of the ring or binder 19 are enlarged and separable, and interposed between and engaging these ends is an operating means which is shown in two forms in the accompanying drawings, the preferred form being that illustrated in Figs. 1, 2, 3, 4 and 7 and the modified form illustrated by Figs. 10, 11 and 12. The expanding and contracting means introduced between the ends 20 of the ring or binder 19 is operable to equally expand and contract the said ring or binder, and it will be understood that the greatest expansive and contractive movements will take place nearer the two ends 20 of the ring or binder, said movements decreasing in extent at a point diametrically opposite the location of the said ends 20. Moreover, the expansive and contractive movements of the ring or binder 19 will be effected at varying angles from the free ends 20 toward a point of the ring or binder diametrically opposite the said ends, and in the present instance provision is made to compensate for the increase in expansive and contractive movements as just specified and to meet the variations in angular disposition of portions of the ring or binder relatively to the extent of expansive and contractive movements thereof. The ring or binder 19 nearest end 20 has an opening 21 therein which is in the form of a slot standing at an oblique angle or tangentially to the rim and formed in a boss 22 which is increased in thickness toward its inner extremity or adjacent to the inner edge of the ring or binder 19. The bosses 22 with their slots 21 are in the same opposed positions relatively to the ring or binder, and the slots 21 are of such length as to compensate for the maximum expansive and contractive movements which will ensue nearest the ends 20 of the ring or binder. At a suitable distance from the bosses 22 the ring or binder is formed with other bosses 23 having less extent than the bosses 22 and formed with straight slots 24, one in each boss 23. The bosses 23 are increased in thickness toward and adjacent to the inner edge of the ring or binder 19 and are constructed also at an oblique angle or tangentially to the said ring, but are nearer a radial relationship with respect to the wheel than are the bosses 22 and the slots 21 thereof. The ring or binder 19 is formed also with other bosses 25 at greater distances from the free ends thereof than the bosses 22 and 23, and said bosses 25 have a radial direction relatively to the wheel or are arranged in true transverse positions relatively to the ring and are formed with slots 26. The bosses 22, 23 and 25 with their respective slots 21, 24 and 26 are the preferred means of compensation for a variation of expansive and contractive movements of the various portions of the ring or binder 19 in a direction around the latter; and engaging the slots are the wedge shaped heads 27 of bolts 28 extending transversely through the felly and serving as the retaining means for holding the ring or binder 19 at all times in association with the felly 6. The bolts 28 always remain in engagement with the ring and felly. When the ring 19 is expanded to secure the demountable rim 8 in place on the rim 7 of the felly 6 the heads 27 of the several bolts 28 occupy the inner portions of the slots 21, 24 and 26 and bind tightly against the bosses 22, 23 and 25 owing to the wedge shape of the bolt heads 27, and, conversely, when the ring or binder 19 is contracted to release the demountable rim 8 and the tire carried thereby, the heads 27 are loosened with respect to said bosses and movement of the ring or binder ensues to a degree sufficient to clear the tire rim 8. The wedging action between the said bolt heads and bosses in the expansive adjustment of the ring or binder 19 prevents loose engagement of the said ring or binder relatively to the felly 6 of the wheel, and in its adjustments the said ring or binder is positively held in movable association with the wheel felly. The variation in the angular disposition of the bosses and slots just explained permits all parts of the ring or binder to regularly and easily recede in expansive adjustment of the ring 19 and to similarly move inwardly in the contractive adjustment of said ring. The outer sides of the ends 20 of the ring are provided with series of concentric segmental ribs 20$^a$ regularly increasing in length reversely from the free edges of said ends outwardly, there being three segments 20$^a$ on each end 20 shown in the present instance.

The operating means for adjusting the ring or binder 19 as shown by Figs. 1, 2, 3, 4, 7, 8 and 9 consists of a plate or disk 27$^a$ held in operative position over the ends 20 of the ring 19 particularly by an inclosing casing, cover, or shield 28$^a$, said disk being centrally disposed over the socket 12, and has a central tubular post 29 with an angular bore 29$^a$ to receive the stem of the key 17. The post 29 extends inwardly to the outer entrance to the socket 12 or to a perforated wear plate 12$^a$ around said socket, and on the rear end of the post ratchet teeth 29$^b$ are formed for engagement with the lug or tooth 14 of the plunger. The lug or tooth 14 of the plunger 13 is normally projected through the perforation of the wear plate 12$^a$ and engages the ratchet teeth 29$^b$ of the post 29 to hold the disk or plate 27$^a$ against movement. On the inner side of the plate or disk 27$^a$, a spiral rib 30 is formed and provides a spiral screw between opposite portions of which the segmental ribs 20$^a$ loosely fit. The spiral rib or screw 30 has an outer free terminal 31, and the said rib or screw 30 is long enough to provide for the practical operation sought. The casing, cover or shield 28$^a$ has a central key opening 32 over the bore 29$^a$ which continues through the center of the plate or disk 27$^a$ for insertion of the stem or shank of the key 17. When the stem or shank of the key 17 is inserted in the post 29 it engages the contact projection 16$^a$ of the plunger 13, and an inward pressure on said key forces the plunger inwardly and disengages the lug or tooth 14 from the ratchet teeth 29$^b$ when the plate or disk will be free to rotate. When the plate or disk 27$^a$ is rotated toward the left, the ends 20 of the ring or binder 19 will be drawn toward each other and the ring or binder throughout its length will be regularly contracted and the outer edge thereof will be drawn inwardly over the adjacent edge of the rim 7 of the felly and away from the edge of the demountable rim 8 with which the said ring or binder 19 has been in engagement, the two positions of the ring or binder being clearly illustrated in Figs. 4 and 8. The contracted adjustment of the ring or binder 19 may be maintained either in its maximum contracted condition or only partially contracted, by withdrawing the key stem from the post 29 and permitting the plunger 13 to cause the lug or tooth 14 to engage the adjacent ratchet teeth 29$^b$ of the post and thereby lock the plate or disk 27$^a$ against movement, and as a consequence maintain the ring 19 in its adjusted position. When the plate or disk 27$^a$ is turned to the right, the ring 19 will be expanded and will be positively locked by removing the key from engagement with the post 29. When the ring or binder 19 is contracted the outer edge thereof draws inwardly to clear the demountable rim 8 and the latter may then be moved sidewise from the rim 7, as shown by Fig. 8, and the ring or binder 19 is retained in this position to permit the demountable rim 8 to be reset, and then the said ring or binder is expanded by turning the disk 27$^a$ to the right and the ends 20 will be caused to recede relatively to each other and at the same time the outer edge of the ring or binder is forced over the adjacent side portion of the demountable rim 8 to lock the latter on the rim 7 of the felly 6.

Figure 11:
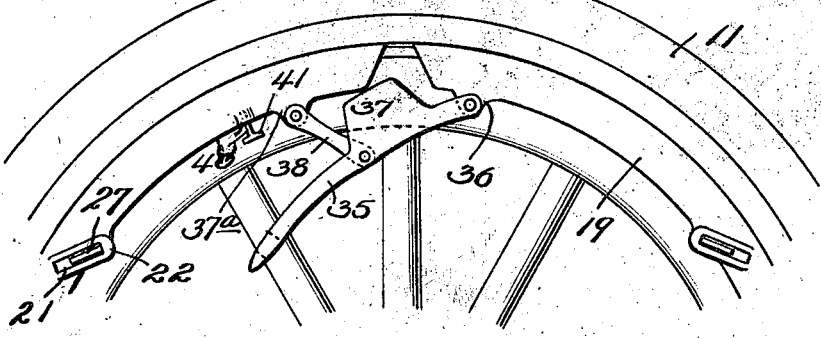
Fig. 11 is a view similar to Fig. 10 showing the parts of the modified form of the attachment in position for releasing the demountable rim.
Figure 12:
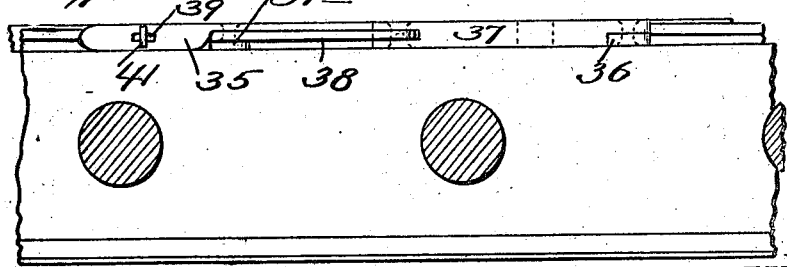
Fig. 12 is a plan view looking toward the inner side of the wheel felly with the wheel spokes in section and showing a modified form of the attachment illustrated by Figs. 10 and 11.

In the modified construction as shown by Figs. 10, 11 and 12 the ring or binder 19 is associated with the felly 6 of the wheel in the same manner as hereinbefore explained, but the means for contracting and expanding the said ring or binder are somewhat changed in structure and consist essentially of a lever 35 fulcrumed at one end to a projection 36 of the said ring or binder 19 and having a closure web or member 37 to fit over the gap or opening between the ends 20 of the said ring or binder. The lever 35 has a link 38 pivotally secured to the intermediate portion thereof and to a projection 37$^a$ of the ring or binder 19 to uniformly move both ends 20 of the ring or binder during the contractive and expansive movements of the latter. The free extremity of the lever 35 is formed with a slot 39 and the inner edge of the ring or binder 19 adjacent to the projection 37$^a$ has a turnpin 40 with a T-head 41 to engage the said slot 39 and lock the lever in its closed position or when the ring or binder 19 is expanded. When the ring or binder embodying the modified structure shown by Figs. 10, 11 and 12 is expanded to maintain the demountable rim 8 on the rim 7 of the felly 6, the lever 35 is closed against the inner edge of the ring or binder as shown by Fig. 10, and the web or member 37 fits the gap or opening between the ends 20 of the said ring or binder and closes this gap and the lever 35 is locked against movement by engagement with the T-headed pin 40, as shown by Figs. 10 and 12. When it is desired to contract the ring or binder 19 to release the demountable rim the T-headed pin 40 is turned to permit the lever 35 to be drawn inwardly, and such inward movement of this lever disengages the web or member 37 from the gap between the ends 20 of the ring or binder 19 and also effects a contraction of the ring or binder through the medium of the link 38 and the attached end of the lever relatively to the ring or binder.

The improved device will be found exceptionally advantageous in coöperation with a demountable rim and whereby the latter may be quickly removed from or placed in position on a wheel rim without the use of the usual lugs or other devices requiring considerable patience and time in the removal and replacement of demountable rims. Either form of the improved device may be quickly operated to release the demountable rim or to secure said rim in firm and positive position on the wheel rim. The ring or binder 19 serving as the essential securing means for the demountable rim, as hereinbefore explained, is always maintained in tight relation to the wheel felly but at the same time may be easily operated to perform its functions or to release and secure a demountable rim relatively to a wheel rim. A particular advantage is that when the adjustment of the ring or binder 19 is made it will be practically impossible for the same to work loose or to vibrate or become inefficient as a positive holding means, particularly in view of the locking catch for the disk 27ª as shown in the first form of the device. The modified structure also embodies a locking means that operates directly to prevent the ends of the ring or binder 19 from moving after expansive adjustment thereof and it may therefore be said that both devices for operating the ring or binder are provided with locking means to prevent movement thereof after an adjustment of the ring or binder has been effected.

What is claimed is:

1. In a device of the class specified, the combination with a wheel having a felly and rim and a demountable rim, of bolts carried by the felly and having wedge-shaped heads, an expansible and contractible ring associated with and attached to one side of the wheel by the bolts and provided with slots engaged by the bolt heads, said slots being of different lengths and partly tangential to the wheel and partly radial to the latter and operating to compensate for the expansion and contraction throughout the length of said ring and also to obviate lost motion.

2. In a device of the class specified, the combination with a wheel having a felly and rim and a demountable rim carrying a tire, of bolt devices mounted in the felly, a ring having means engaging the extremities thereof for expanding and contracting the same and associated with and attached directly to one side of the wheel by the bolt devices and independent of the wheel rim, the said rim having adjacent radial slots and remaining slots regularly disposed at different angles on opposite sides of the radial slots, the slots varying in length and those nearest the ring extremities being longer than the remaining slots, all of the slots engaged by the bolt devices to compensate for a variation in movement of the ring throughout its length and to prevent lost motion during the operation of the ring.

3. In a device of the class specified, the combination with a wheel having a felly and rim forming a part thereof and a demountable rim carrying a tire and movably associated with the wheel rim, of wedge-headed bolts mounted in the felly, an expanding and contracting ring movably attached directly to one side of the wheel by the bolts and independent of the rim of the wheel, the said ring having its outer edge projectable over the ring of the wheel to engage the demountable rim, the ring having radial slots and tangential slots at opposite sides of the radial slots all engaged by said bolts, the tangential slots all being directed inwardly and of different lengths to compensate for a variation in the expansion and contraction of the ring throughout the length of the latter when operated to either secure or release the demountable rim.

4. In a device of the class specified, the combination with a wheel having a felly and a rim and a demountable rim carrying a tire and removably associated with the wheel rim, of an expanding and contracting ring independent of the wheel rim and having operating extremities and directly applied to the side of the wheel felly, the ring having adjacent radial slots and other slots throughout the length thereof similarly arranged on opposite sides of the radial slots and varying in angular position with relation to said radial slots and each other, the slots being also of different lengths and those nearest the ring extremities being longer than the remaining slots, fastenings for the ring engaging the wheel felly and provided with wedge-heads movable in said slots and operating to obviate lost motion, the ring also having means engaging the operating extremities for expanding and contracting the same.

5. The combination with a wheel having a rim and a demountable rim carrying a tire removably associated with the wheel rim, of an expansible and contractible ring applied to one side of the wheel in a position to engage the demountable rim, and provided with outer segmental ribs on the adjacent ends thereof, and a rotatable disk having an inner spiral rib coöperating with the ribs on the ends of the ring for expanding and contracting the latter, devices being arranged adjacent to said disk for automatically locking it in any adjustment of the ring.

6. In a device of the class specified, the combination with a wheel having a rim and a demountable rim carrying a tire removably associated with the wheel rim, of an expansible and contractible ring carried by one side of the wheel for engaging the demountable rim and having concentric segmental ribs on outer sides of the ends thereof, a rotatable disk having a continuous spiral rib on the inner side thereof engaged by the segmental ribs of the ring ends, means for rotating the disk in opposite directions, and automatically operating catch means to lock the disk against movement when the said disk rotating means is removed, the said catch means being released when the disk rotating means is applied.

7. In a device of the class specified, the combination with a wheel having a rim and a demountable rim carrying a tire removably associated with the said wheel rim, of an expansible and contractible ring applied to one side of the wheel for securing the demountable rim and tire in place and having opposed adjacent free ends provided with segmental ribs on the outer sides thereof, a rotatable disk mounted over the ends of the ring and provided with a continuous spiral rib engaged by said segmental ribs of the ring ends, and means for rotating the said disk in opposite directions to expand and contract the ring ends and remaining portion of the ring.

In testimony whereof we have hereunto set our hands in presence of two subscribing witnesses.

ALBERT D. FISHER.
THOMAS S. SCOTT.

Witnesses:
  JOHN W. BAYLESS,
  JNO. W. HARDING.